United States Patent
Cai et al.

(10) Patent No.: US 12,425,952 B2
(45) Date of Patent: Sep. 23, 2025

(54) METHOD FOR ENABLING A TERMINAL TO ACCESS A BASE STATION, AND BASE STATION, TERMINAL AND COMMUNICATION SYSTEM

(71) Applicant: CHINA TELECOM CORPORATION LIMITED, Beijing (CN)

(72) Inventors: Bowen Cai, Beijing (CN); Weiliang Xie, Beijing (CN); Hua Zhang, Beijing (CN); Han Guo, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 416 days.

(21) Appl. No.: 18/020,670

(22) PCT Filed: May 11, 2021

(86) PCT No.: PCT/CN2021/092988
§ 371 (c)(1),
(2) Date: Feb. 10, 2023

(87) PCT Pub. No.: WO2022/033091
PCT Pub. Date: Feb. 17, 2022

(65) Prior Publication Data
US 2024/0040474 A1    Feb. 1, 2024

(30) Foreign Application Priority Data
Aug. 12, 2020   (CN) .......................... 202010809291.4

(51) Int. Cl.
*H04W 48/02*    (2009.01)
*H04W 8/24*     (2009.01)
(Continued)

(52) U.S. Cl.
CPC ............. *H04W 48/02* (2013.01); *H04W 8/24* (2013.01); *H04W 48/10* (2013.01); *H04W 48/16* (2013.01)

(58) Field of Classification Search
None
See application file for complete search history.

(56) References Cited

U.S. PATENT DOCUMENTS

| | | | |
|---|---|---|---|
| 10,512,037 B1 | 12/2019 | Sung et al. | |
| 11,013,054 B2 * | 5/2021 | Yi | .......................... H04W 68/02 |

(Continued)

FOREIGN PATENT DOCUMENTS

| | | |
|---|---|---|
| CN | 102026328 A | 8/2011 |
| CN | 109983825 A | 7/2019 |

(Continued)

OTHER PUBLICATIONS

International Search Report and Written Opinion issued on Aug. 10, 2021 in corresponding Application No. PCT/CN2021/092988; 8 pages.

(Continued)

*Primary Examiner* — Hong S Cho
(74) *Attorney, Agent, or Firm* — Andrew M. Calderon; Calderon Safran & Wright P.C.

(57) ABSTRACT

The present disclosure relates to a method for enabling a terminal to access a base station. The method includes: broadcasting, by a first BS not supporting a shared carrier, a first priority list, wherein the first priority list comprises information indicating that a priority of a BS that does not support the shared carrier is higher than that of a BS that supports the shared carrier; receiving, by the first BS, a first access request from a terminal, receiving, by the first BS, capability information from the terminal in a process of establishing a connection with the terminal; and completing, (Continued)

by the first BS, the connection with the terminal to enable the terminal to access a non-shared network, in a case where the terminal does not support the frequency band of the sharing operator in the shared carrier.

19 Claims, 6 Drawing Sheets

(51) Int. Cl.
*H04W 48/10* (2009.01)
*H04W 48/16* (2009.01)

(56) References Cited

U.S. PATENT DOCUMENTS

| | | | |
|---|---|---|---|
| 11,071,111 B2* | 7/2021 | Kim | H04W 72/21 |
| 11,457,472 B2 | 9/2022 | Si et al. | |
| 2006/0073831 A1 | 4/2006 | Guyot et al. | |
| 2011/0317654 A1 | 12/2011 | Ishida et al. | |
| 2015/0092758 A1 | 4/2015 | Chen et al. | |
| 2016/0073310 A1* | 3/2016 | Hapsari | H04W 36/0064 455/437 |
| 2018/0249387 A1 | 8/2018 | Zhang et al. | |
| 2019/0215798 A1 | 7/2019 | Kim et al. | |
| 2019/0268838 A1 | 8/2019 | Gao et al. | |
| 2020/0252959 A1 | 8/2020 | Sun et al. | |
| 2021/0029702 A1 | 1/2021 | Serravalle et al. | |
| 2022/0132408 A1 | 4/2022 | Damnjanovic et al. | |

FOREIGN PATENT DOCUMENTS

| | | |
|---|---|---|
| CN | 110855415 A | 2/2020 |
| CN | 110945950 A | 3/2020 |
| CN | 111372253 A | 7/2020 |
| CN | 111492694 A | 8/2020 |
| CN | 111510945 A | 8/2020 |
| JP | 2008-516500 A | 5/2008 |
| JP | 2014-518019 A | 7/2014 |
| WO | 2010/103750 A1 | 9/2010 |
| WO | 2018062907 A1 | 4/2018 |

OTHER PUBLICATIONS

International Preliminary Report on Patentability and Written Opinion issued on Feb. 7, 2023 in corresponding Application No. PCT/CN2021/092988; 15 pages.

Office Action issued in corresponding Chinese Patent Application No. 202010809291.4 on Jul. 5, 2022; 25 pages.

Notice of Reasons for Refusal dated Apr. 26, 2024 in JP Application No. 2023-509630 with English Translation, 16 pages.

* cited by examiner

METHOD FOR ENABLING A TERMINAL TO ACCESS A BASE STATION, AND BASE STATION, TERMINAL AND COMMUNICATION SYSTEM

CROSS-REFERENCE TO RELATED APPLICATIONS

The present disclosure is based on and claims priority of Chinese application for invention No. 202010809291.4, filed on Aug. 12, 2020, the disclosure of which is hereby incorporated into this disclosure by reference in its entirety The present disclosure is a U.S. National Stage Application under 35 U.S.C. § 371 of International Patent Application No. PCT/CN2021/092988, filed on May 11, 2021, which is based on and claims priority of Chinese application for invention No. 202010809291.4 filed on Aug. 12, 2020, the disclosures of both of which are hereby incorporated into this disclosure by reference in its entirety.

TECHNICAL FIELD

The present disclosure relates to the field of communication technologies, and in particular, to a method for enabling a terminal to access a base station, a base station, a terminal and a communication system.

BACKGROUND

The 5G technology requires higher operating frequency bands and a lot of base stations, which are expensive and have high power consumption (about 3 times of 4G). In order to build 5G base stations with low cost and high efficiency, it is necessary for operators to build and share 5G base stations.

There two schemes for operators constructing and sharing an access network are that a shared base station use independent carriers or shared carriers. A shared carrier is a carrier with a large continuous bandwidth formed by carrier bands owned by different operators.

A new terminal (such as a 5G terminal) can access a frequency band of its operator in a shared carrier, or a frequency band of another sharing operator (other than its operator) in the shared carrier. An old terminal (such as a 4G terminal) can only access the frequency band of its operator in a shared carrier. That is, both new and old terminals can access the shared carrier.

SUMMARY

According to some embodiments of the present disclosure, there is provided a method for enabling a terminal to access a base station, comprising: broadcasting, by a first Base Station (BS) not supporting a shared carrier, a first priority list, wherein the first priority list comprises information indicating that a priority of a BS that does not support the shared carrier is higher than that of a BS that supports the shared carrier; receiving, by the first BS, a first access request from a terminal, wherein the first access request indicates that the terminal selects to access the first BS according to the first priority list; receiving, by the first BS, capability information from the terminal in a process of establishing a connection with the terminal, wherein the capability information comprises information about whether the terminal supports a frequency band of a sharing operator in the shared carrier; and completing, by the first BS, the connection with the terminal to enable the terminal to access a non-shared network, in a case where the terminal does not support the frequency band of the sharing operator in the shared carrier.

In some embodiments, the method further comprises: sending, by the first BS, a second priority list to the terminal, in a case where the terminal supports the frequency band of the sharing operator in the shared carrier, wherein the second priority list comprises information indicating that a priority of a BS that does not support the shared carrier is lower than that of a BS that supports the shared carrier, for triggering the terminal to reselect and access a BS that supports the shared carrier.

In some embodiments, the method further comprises: receiving, by a second BS supporting the shared carrier, a second access request from the terminal, wherein the second access request indicates that the terminal reselects to access the second BS according to the second priority list; receiving, by the second BS, the capability information from the terminal in a process of establishing a connection with the terminal; and completing, by the second BS, the connection with the terminal to enable the terminal to access the shared network, in a case where the terminal supports the frequency band of the sharing operator in the shared carrier.

In some embodiments, the method further comprises: broadcasting, by a second BS supporting the shared carrier, a third priority list, wherein the third priority list comprises information indicating that a priority of a BS that does not support the shared carrier is lower than that of a BS that supports the shared carrier; receiving, by the second BS, a third access request from the terminal, wherein the third access request indicates that the terminal selects to access the second BS according to the third priority list; receiving, by the second BS, the capability information from the terminal in a process of establishing a connection with the terminal; and completing, by the second BS, the connection with the terminal to enable the terminal to access the shared network, in a case where the terminal supports the frequency band of the sharing operator in the shared carrier.

In some embodiments, the method further comprises: sending, by the second BS, a fourth priority list to the terminal to trigger the terminal to reselect and access a BS that does not support the shared carrier, in a case where the terminal does not support the frequency band of the sharing operator in the shared carrier, wherein the fourth priority list comprises information indicating that the priority of a BS that does not support the shared carrier is higher than that of a BS that supports the shared carrier.

In some embodiments, the method further comprises: receiving, by the first BS, a fourth access request from the terminal, wherein the fourth access request indicates that the terminal reselects to access the first BS according to the fourth priority list; receiving, by the first BS, the capability information from the terminal in a process of establishing a connection with the terminal; and completing, by the first BS, the connection with the terminal to enable the terminal to access a non-shared network, in a case where the terminal does not support the frequency band of the sharing operator in the shared carrier.

In some embodiments, the second BS receives the capability information sent from the terminal through a UE Capability Information message, and the second BS sends the fourth priority list to the terminal through a Radio Resource Control (RRC) Reconfiguration message.

In some embodiments, the first BS receives the capability information sent from the terminal through a UE Capability Information message, and the first BS sends the second priority list to the terminal through a Radio Resource Control (RRC) Reconfiguration message.

According to other embodiments of the present disclosure, there is provided a method for enabling a terminal to access a base station, performed by a terminal, comprising: receiving a first priority list broadcast by a first Base Station (BS) not supporting a shared carrier, and the first priority list comprises information indicating that a priority of a BS that does not support the shared carrier is higher than that of a BS that supports the shared carrier; selecting the first BS according to the first priority list and sending a first access request to the first BS; sending capability information to the first BS in a process of establishing a connection with the first BS, wherein the capability information comprises information about whether the terminal supports a frequency band of a sharing operator in the shared carrier; and completing the connection with the first BS to access a non-shared network, in a case where the terminal does not support the frequency band of the sharing operator in the shared carrier.

In some embodiments, the method further comprises: receiving a second priority list from the first BS, in a case where the terminal supports the frequency band of the sharing operator in the shared carrier, wherein the second priority list comprises information indicating that a priority of a BS that does not support the shared carrier is lower than that of a BS that supports the shared carrier; measuring signals of surrounding BSs supporting the shared carrier to obtain a first measurement result according to the second priority list; selecting a second BS supporting a shared carrier according to the first measurement result and sending a second access request to the second BS; sending the capability information to the second BS in a process of establishing a connection with the second BS; and completing the connection with the second BS to access the shared network, in a case where the terminal supports the frequency band of the sharing operator in the shared carrier.

In some embodiments, the method further comprises: receiving a third priority list broadcast by a second BS supporting a shared carrier, wherein the third priority list comprises information indicating that a priority of a BS that does not support the shared carrier is lower than that of a BS that supports the shared carrier; selecting the second BS according to the third priority list and sending a third access request to the second BS; sending the capability information to the second BS in a process of establishing a connection with the second BS; and completing the connection with the second BS to access the shared network, in a case where the terminal supports the frequency band of the sharing operator in the shared carrier.

In some embodiments, the method further comprises: receiving a fourth priority list sent by the second BS, in a case where the terminal does not support the frequency band of the sharing operator in the shared carrier, wherein the fourth priority list comprises information indicating that a priority of a BS that does not support the shared carrier is higher than that of a BS that supports the shared carrier; measuring signals of surrounding BSs not supporting the shared carrier to obtain a second measurement result according to the fourth priority list; selecting the first BS according to the second measurement result and sending a fourth access request to the first BS; sending the capability information to the first BS in a process of establishing a connection with the first BS; and completing the connection with the first BS to access a non-shared network, in a case where the terminal does not support the frequency band of the sharing operator in the shared carrier.

In some embodiments, in a case where the terminal receives the first priority list broadcast by the first BS and the third priority list broadcast by the second BS, the terminal selects the first priority list or the third priority list according to the capability information, wherein the terminal selects the first priority list in a case where the terminal does not support the frequency band of the sharing operator in the shared carrier, and selects the third priority list in a case where the terminal supports the frequency band of the sharing operator in the shared carrier.

According to still other embodiments of the present disclosure, there is provided a BS, comprising: a broadcasting module configured to broadcast a first priority list, wherein the first BS is a BS that does not support a shared carrier, and the first priority list comprises information indicating that a priority of a BS that does not support a shared carrier is higher than that of a BS that supports a shared carrier; a receiving module configured to receive a first access request from a terminal, wherein the first access request indicates that the terminal selects to access the first BS according to the first priority list and receive capability information sent from the terminal in a process of establishing a connection with the terminal, wherein the capability information comprises information about whether the terminal supports a frequency band of a sharing operator in a shared carrier; and a connecting module configured to complete the connection with the terminal to enable the terminal to access to a non-shared network, in a case where the terminal does not support the frequency band of the sharing operator in the shared carrier.

In some embodiments, the BS further comprises: a sending module configured to send a second priority list to the terminal, in a case where the terminal supports the frequency band of the sharing operator in the shared carrier, wherein the second priority list comprises information indicating that a priority of a BS that does not support a shared carrier is lower than that of a BS that supports a shared carrier, for triggering the terminal to reselect and access a BS that supports a shared carrier.

In some embodiments, the receiving module is further configured to receive a fourth access request from the terminal, wherein the fourth access request indicates that the terminal reselects to access the first BS according to a fourth priority list sent by a second BS, and the fourth priority list comprises information indicating that the priority of a BS that does not support a shared carrier is higher than that of a BS that supports a shared carrier.

According to still other embodiments of the present disclosure, there is provided a terminal, comprising: a receiving module configured to receive a first priority list broadcast by a first Base Station (BS), wherein the first BS is a BS that does not support a shared carrier, and the first priority list comprises information indicating that a priority of a BS that does not support a shared carrier is higher than that of a BS that supports a shared carrier; a sending module configured to select the first BS according to the first priority list, send a first access request to the first BS and send capability information to the first BS in a process of establishing a connection with the first BS, wherein the capability information comprises information about whether the terminal supports a frequency band of a sharing operator in a shared carrier; and a connecting configured to complete the connection with the first BS to access to a non-shared network, in a case where the terminal does not support the frequency band of the sharing operator in the shared carrier.

In some embodiments, the terminal further comprises: a measurement module, wherein: the receiving module is further configured to receive a second priority list sent from the first BS, in a case where the terminal supports the frequency band of the sharing operator in the shared carrier, wherein the second priority list comprises information indicating that a priority of a BS that does not support a shared carrier is lower than that of a BS that supports a shared carrier; the measurement module is configured to measure signals of surrounding BSs that support a shared carrier to obtain a first measurement result according to the second priority list; the sending module is further configured to select a second BS according to the first measurement result, send a second access request to the second BS and send the capability information to the second BS in a process of establishing a connection with the second BS, wherein the second BS is a BS that supports a shared carrier; and the connecting module is further configured to complete the connection with the second BS to access to a shared network, in a case where the terminal supports the frequency band of the sharing operator in the shared carrier.

In some embodiments, the receiving module is further configured to receive a third priority list broadcast by a second BS, wherein the second BS is a BS that supports a shared carrier, and the third priority list comprises information indicating that a priority of a BS that does not support a shared carrier is lower than that of a BS that supports a shared carrier; the sending module is further configured to select the second BS according to the third priority list and sending a third access request to the second BS, send a third access request to the second BS and send the capability information to the second BS in a process of establishing a connection with the second BS; and the connecting module is further configured to complete the connection with the second BS to access to a shared network, in a case where the terminal supports the frequency band of the sharing operator in the shared carrier.

In some embodiments, the terminal further comprises: a measurement module, wherein: the receiving module is further configured to receive a fourth priority list sent by the second BS, in a case where the terminal does not support the frequency band of the sharing operator in the shared carrier, wherein the fourth priority list comprises information indicating that a priority of a BS that does not support a shared carrier is higher than that of a BS that supports a shared carrier; the measuring module is configured to measure signals of surrounding BSs that do not support a shared carrier to obtain a second measurement result according to the fourth priority list; the sending module is configured to select the first BS according to the second measurement result, send a fourth access request to the first BS and send the capability information to the first BS in a process of establishing a connection with the first BS; and the connecting module is further configured to complete the connection with the first BS to access to a non-shared network, in a case where the terminal does not support the frequency band of the sharing operator in the shared carrier.

In some embodiments, the receiving module is configured to select the first priority list or the third priority list according to the capability information, in a case where the terminal receives the first priority list broadcast by the first BS and the third priority list broadcast by the second BS, wherein the terminal selects the first priority list in a case where the terminal does not support the frequency band of the sharing operator in the shared carrier, and select the third priority list in a case where the terminal supports the frequency band of the sharing operator in the shared carrier.

According to still other embodiments of the present disclosure, there is provided a communication system, comprising: a first BS according to any of the foregoing embodiments and a terminal according to any of the foregoing embodiments.

In some embodiments, the communication system further comprises: a second BS supporting the shared carrier, configured to receive a second access request from the terminal, receive capability information from the terminal in a process of establishing a connection with the terminal and complete the connection with the terminal to enable the terminal to access to a shared network, in a case where the terminal supports the frequency band of the sharing operator in the shared carrier, wherein the second access request indicates that the terminal reselects to access the second BS according to the second priority list, and the capability information comprises information about whether the terminal supports the frequency band of the sharing operator in the shared carrier.

In some embodiments, the second BS is configured to broadcast a third priority list, receive a third access request from the terminal, receive the capability information from the terminal in a process of establishing a connection with the terminal and complete the connection with the terminal to enable the terminal to access a shared network, in a case where the terminal supports the frequency band of the sharing operator in the shared carrier, wherein the third priority list comprises information indicating that the priority of a BS that does not support the shared carrier is lower than that of a BS that supports the shared carrier, and the third access request indicates that the terminal selects to access the second BS according to the third priority list.

In some embodiments, the second BS is further configured to send a fourth priority list to the terminal to trigger the terminal to reselect and access a BS that does not support the shared carrier, in a case where the terminal does not support the frequency band of the sharing operator in the shared carrier, wherein the fourth priority list comprises information indicating that the priority of a BS that does not support the shared carrier is higher than that of a BS that supports the shared carrier.

According to further embodiments of the present disclosure, there is provided an electronic device, comprising: a processor; a memory coupled to the processor for storing instructions, which when executed by the processor, cause the processor to execute the method for enabling a terminal to access a base station according to any one of the foregoing embodiments.

According to still other embodiments of the present disclosure, there is provided a non-transitory computer-readable storage medium on which a computer program is stored, wherein the program, when executed by a processor, implements the steps of the method for enabling a terminal to access a base station according to any one of the foregoing embodiments.

Other features and advantages of the present invention will become apparent from the following detailed description of exemplary embodiments of the present disclosure with reference to the accompanying drawings.

BRIEF DESCRIPTION OF THE DRAWINGS

The accompanying drawings, which are comprised to provide a further understanding of the present disclosure and are incorporated in and constitute a part of this specification, illustrate embodiments of the invention, and together with the illustrative embodiments of the present application serve to explain the present disclosure, but are not limitation thereof.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that in a long period of transition to 5G networks, there are still a large number of Base Stations (BSs) that do not support a shared carrier and old terminals in current networks. At present, a BS that support a shared carrier can be accessed by both new and old terminals, which is easy to cause heavy load on the BS that support a shared carrier, while other BSs that do not support a shared carrier are idle, affecting qualities of services of the terminals accordingly.

A technical problem to be solved by the present disclosure is how to improve a load balance of BSs that support a shared carrier and those that do not support a shared carrier.

A method for enabling a terminal to access a base station provided in the present disclosure will be described below with reference to FIGS. 1 to 3.

Figure 1:
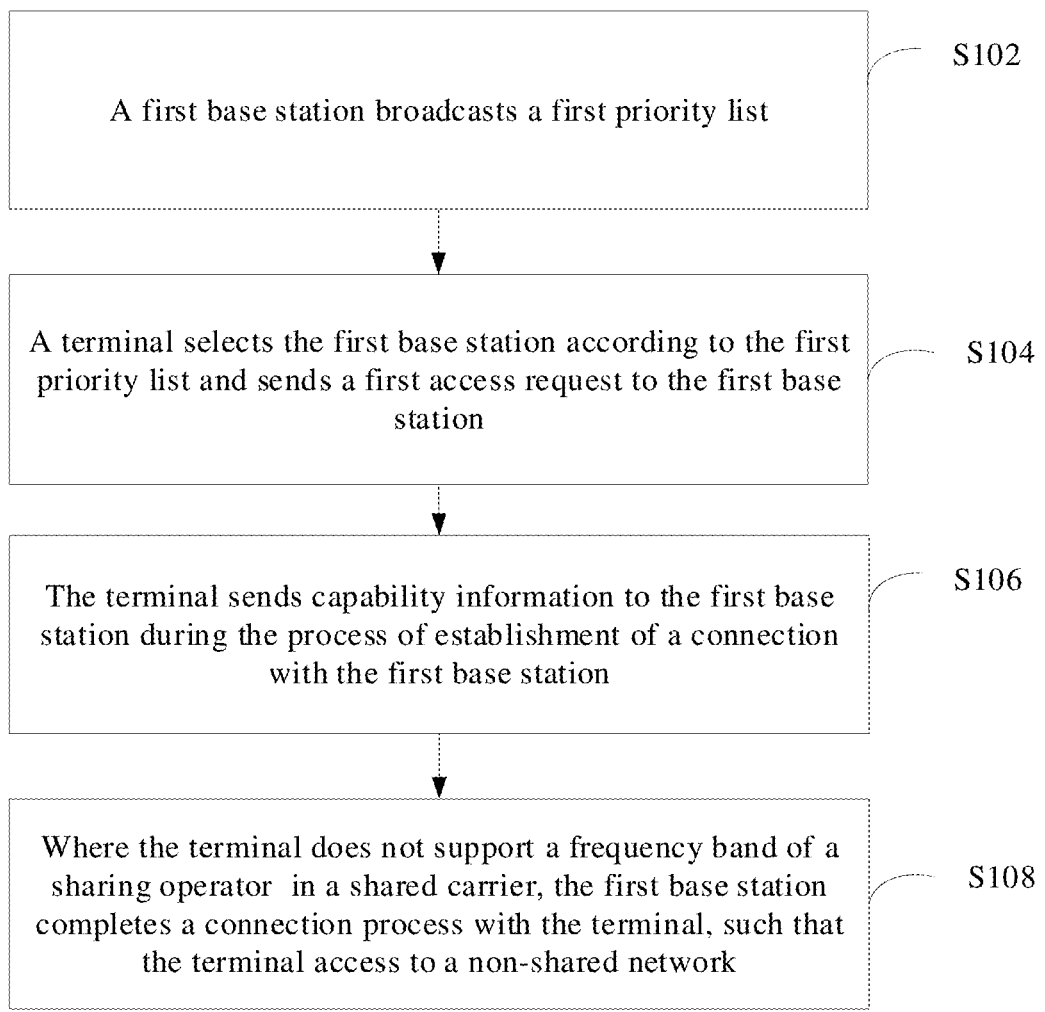
FIG. 1 shows the flow diagram of a method for enabling a terminal to access a base station according to some embodiments of the present disclosure.

FIG. 1 is a flowchart of a method for enabling a terminal to access a base station according to some embodiments of the present disclosure. As shown in FIG. 1, the method of these embodiments comprises: steps S102 to S108.

In step S102, a first BS broadcasts a first priority list, and a terminal receives the first priority list broadcast by the first BS correspondingly.

The first BS is a BS that does not support a shared carrier, and the first priority list comprises information indicating that a priority of a BS that does not support a shared carrier is higher than that of a BS that supports a shared carrier. The first priority list may comprise identifiers of BSs in the whole network and corresponding priority levels of the various BSs, or the first priority list may comprise identifiers of the first BS and its surrounding BSs and corresponding priority levels of the various BSs. For example, a first priority can be assigned to all BSs that do not support a shared carrier, and a second priority can be assigned to BSs that support a shared carrier, wherein the first priority is higher than the second priority. It is also possible to assign different priorities to BSs of a same type according to actual needs. For example, different priorities can be assigned to the BSs that do not support a shared carrier according to their modes. For example, 4G BSs have a higher priority, and 3G or 2G BSs have a lower priority. The present disclosure is not limited to the above example, but in general, the priorities of the BSs that do not support a shared carrier are higher than that of the BSs that support a shared carrier.

In step S104, the terminal selects the first BS according to the first priority list and sends a first access request to the first BS, and the first BS receives the first access request correspondingly.

The terminal can measure a signal quality of each BS that does not support a shared carrier in priority according to the first priority list. For example, if the signal quality of the first BS is the best or meets a preset condition, the terminal can select the first BS and send a first access request. That is, the first access request represents that the terminal selects to access the first BS according to the first priority list. For details, a reference can be made to a process of a terminal selecting and accessing a resident cell after the terminal is turned on in existing standards. The first access request is, for example, an RRC (radio resource control) connection request.

In step S106, the terminal sends capability information to the first BS during a process of establishing a connection with the first BS, and the first BS receives the capability information sent by the terminal correspondingly during the process of establishing the connection with the terminal.

For example, the capability information comprises information about whether the terminal supports a frequency band of a sharing operator in a shared carrier. For example, the capability information comprises, a frequency band supported by the terminal. The first BS can determine whether the frequency band supported by the terminal is comprised in the frequency band of the sharing operator in the shared carrier.

In some embodiments, the first BS sends a UE Capability Enquiry message to the terminal, and the terminal sends the capability information to the first BS through a UE Capability Information message.

In step S108, the first BS completes the connection with the terminal to enable the terminal to access a non-shared network, in a case where the terminal does not support the frequency band of the sharing operator in the shared carrier.

The first BS verifies the capability information of the terminal. If the terminal does not support the frequency band of the sharing operator in the shared carrier, the terminal is enabled to access a non-shared network and reside in the first BS.

In the above embodiment, the first BS, as a BS that does not support a shared carrier, can broadcast the first priority list that comprises information indicating that the priority of a BS that does not support a shared carrier is higher than that of a BS that supports a shared carrier, to enable the terminal to select to access a BS that does not support a shared carrier in priority after receiving the first priority list. Further, the first BS receives the capability information reported by the terminal, verifies the capability information of the terminal. If the terminal does not support the frequency band of the sharing operator in the shared carrier, the first BS completes the connection with the terminal to enable the terminal to access the non-shared network. In the above embodiment, through broadcasting the first priority list by a BS that does not support a shared carrier and reporting capability information by a terminal, an old terminal that does not support a frequency band of a shared operator in a shared carrier can access a BS that does not support a shared carrier as much as possible, which can improve a load balance between BSs that supports a shared carrier and BSs that does not support a shared carrier, reduce idle time of BSs that does not support a shared carrier, and therefore improve an overall service quality.

A method for a enabling a terminal to access a base station according to other embodiments of the present disclosure will be described below with reference to FIG. 2.

Figure 2:
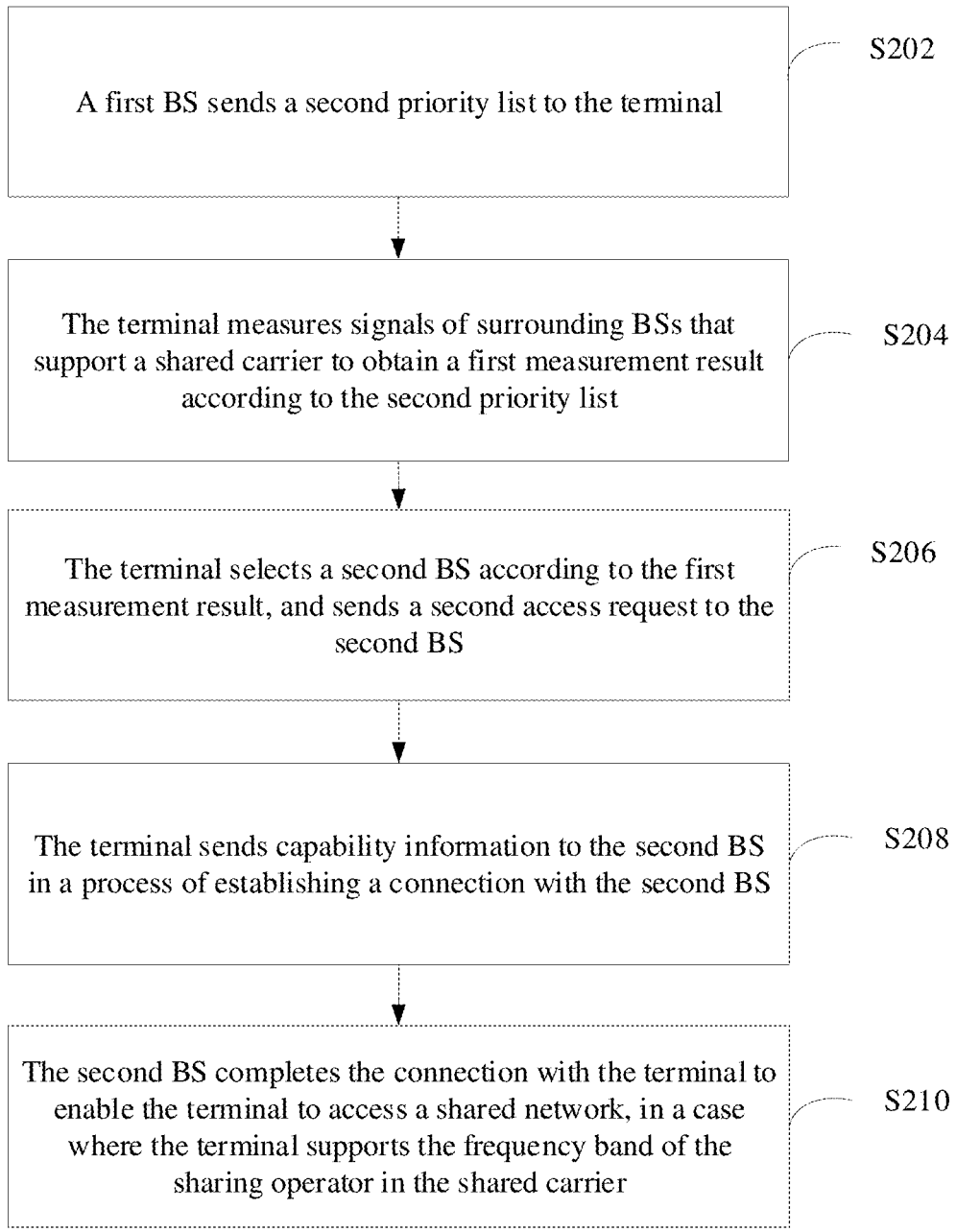
FIG. 2 shows the flow diagram of a method for enabling a terminal to access a base station according to other embodiments of the present disclosure.

FIG. 2 is a flowchart of a method for enabling a terminal to access a base station according to other embodiments of the present disclosure. As shown in FIG. 2, the method of these embodiments comprises: steps S202 to S210.

In step S202, a first BS sends a second priority list to the terminal and the terminal receives the second priority list sent by the first BS correspondingly, in a case where the terminal supports the frequency band of the sharing operator in the shared carrier.

The second priority list is individually sent to the terminal by the first BS, and comprises information indicating that a priority of a BS that does not support a shared carrier is lower than that of a BS that supports a shared carrier. The second priority list may comprise identifiers of all BSs in the whole network and corresponding priority levels of the various BSs, or the second priority list may comprise identifiers of the first BS and its surrounding BSs and corresponding priority levels of the various BSs. For example, a first priority can be assigned to BSs that support a shared carrier, and a second priority can be assigned to BSs that do not support a shared carrier, wherein the first priority is higher than the second priority. It is also possible to assign different priorities to BSs of a same type according to actual needs. However, in general, the priorities of the BSs that do not support a shared carrier are lower than that of BSs that support a shared carrier.

In some embodiments, the first BS sends the second priority list to the terminal through a RRC Reconfiguration message. Steps S202 and S208 can be executed in parallel.

In step S204, the terminal measures signals of surrounding BSs that support a shared carrier to obtain a first measurement result according to the second priority list.

After receiving the second priority list, the terminal searches the signals of the surrounding BSs that support a shared carrier. For example, the terminal receives signals from multiple BSs and determines a type and priority of each BS according to BS identifiers in the second priority list.

In step S206, the terminal selects a second BS according to the first measurement result, and sends a second access request to the second BS, and the second BS receives the second access request correspondingly.

The second BS is a BS that supports a shared carrier. The terminal may receive signals from multiple BSs that support a shared carrier, and can determine whether a signal quality of each BS that supports a shared carrier meets a first access condition. For example, the first access condition comprises a first signal quality threshold. A BS (for example, a second BS) that supports a shared carrier and meets the first access condition is selected. The first access condition can be specified according to actual needs. For example, it can be, but not limited to, a signal quality higher than a signal quality of the first BS. Alternatively, the terminal can select a BS with the best signal quality from the BSs that support a shared carrier as the second BS.

In step S208, the terminal sends capability information to the second BS in a process of establishing a connection with the second BS and the second BS receives the capability information sent by the terminal correspondingly during the process of establishing the connection with the terminal.

The capability information comprises information about whether the terminal supports a frequency band of a sharing operator in a shared carrier. For example, the capability information comprises a frequency band supported by the terminal. The second BS can determine whether the frequency band supported by the terminal is comprised in the frequency band of the sharing operator in the shared carrier.

In step S210, the second BS completes the connection with the terminal to enable the terminal to access a shared network, in a case where the terminal supports the frequency band of the sharing operator in the shared carrier.

The second BS verifies the capability information of the terminal. If the terminal supports the frequency band of the sharing operator in the shared carrier, the terminal is enabled to access the shared network and reside in the second BS.

In the above embodiment, the terminal supports the frequency band of the sharing operator in the shared carrier. The first BS further sends the second priority list to guide the terminal to perform a cell re-selection and access the second BS.

Different terminals can be guided to different networks for residence, which can achieve an accurate user separation, and achieve a load balance between the shared network and non-shared network.

A method for enabling a terminal to access a base station according to still other embodiments of the present disclosure will be described below with reference to FIG. 3.

Figure 3:
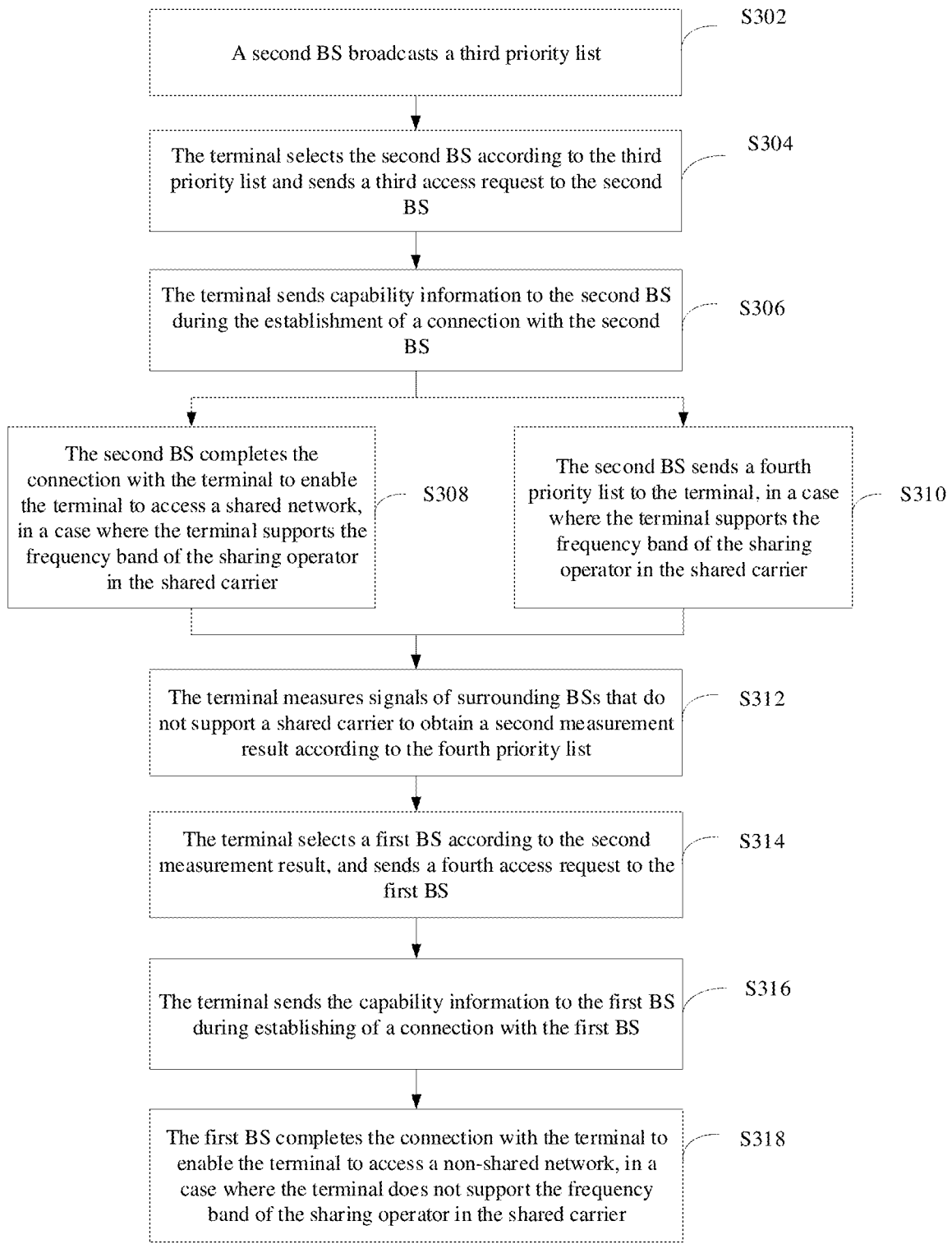
FIG. 3 shows the flow diagram of a method for enabling a terminal to access a base station according to still other embodiments of the present disclosure.

FIG. 3 is a flowchart of a method for enabling a terminal to access a base station according to still other embodiments of the present disclosure. As shown in FIG. 3, the method of these embodiments comprises: steps S302 to S318.

In step S302, a second BS broadcasts a third priority list, and a terminal receives the third priority list broadcast by the second BS correspondingly.

For example, the third priority list comprises information indicating that a priority of a BS that does not support a shared carrier is lower than that of a BS that supports a shared carrier. The third priority list may comprise identifiers of all BSs in the whole network and corresponding priority levels of the various BSs, or the third priority list may comprise identifiers of the second BS and its surrounding BSs and corresponding priority levels of the various BSs. If both of the third priority list and the first priority list comprise the identifiers of all BSs in the whole network and the corresponding priority levels of the various BSs, the third priority list and the first priority list may be identical.

In some embodiments, in a case where the terminal receives the first priority list broadcast by the first BS and the third priority list broadcast by the second BS, the terminal selects the first priority list or the third priority list according to the capability information, wherein the terminal selects the first priority list in a case where the terminal does not support the frequency band of the sharing operator in the shared carrier, and selects the third priority list in a case where the terminal supports the frequency band of the sharing operator in the shared carrier.

In step S304, the terminal selects the second BS according to the third priority list and sends a third access request to the second BS, and the second BS receives the third access request correspondingly.

According to the third priority list, the terminal can measure a signal quality of each BS that supports a shared carrier in priority. For example, if the signal quality of the second BS is the best or meets a preset condition, the terminal can select the second BS and initiate the third access request. That is, the third access request indicates that the terminal selects to access the second BS according to the third priority list. For details, a reference can be made to a process in existing standards that a terminal selects and accesses a resident cell after the terminal turns on. The third access request is, for example, an RRC connection request.

In step S306, the terminal sends capability information to the second BS during the establishment of a connection with the second BS, and the second BS receives the capability information sent by the terminal correspondingly.

For example, the capability information comprises the capability information comprises information about whether the terminal supports a frequency band of a sharing operator in a shared carrier. For example, the capability information comprises a frequency band supported by the terminal. The second BS can determine whether the frequency band supported by the terminal is comprised in the frequency band of the sharing operator in the shared carrier.

The second BS sends a UE Capability Enquiry message to the terminal, and the terminal sends capability information to the second BS through a UE Capability Information message.

In step S308, the second BS completes the connection with the terminal to enable the terminal to access a shared network, in a case where the terminal supports the frequency band of the sharing operator in the shared carrier.

The second BS verifies the capability information of the terminal. If the terminal supports the frequency band of the sharing operator in the shared carrier, the terminal is enabled to access the shared network and reside in the second BS.

In step S310, the second BS sends a fourth priority list to the terminal, and the terminal receives the fourth priority list sent by the second BS correspondingly, in a case where the terminal supports the frequency band of the sharing operator in the shared carrier.

The fourth priority list is individually sent to the terminal by the fourth BS, and comprises information indicating that a priority of a BS that does not support a shared carrier is higher than that of a BS that supports a shared carrier. For example, the fourth priority list may comprise identifiers of all BSs in the whole network and corresponding priority levels of the various BSs, or the fourth priority list may comprise identifiers of the second BS and its surrounding BSs and corresponding priority levels of the various BSs. If both of the fourth priority list and the second priority list comprise the identifiers of all BSs in the whole network and the corresponding priority levels of the various BSs, the fourth priority list and the second priority list may be identical.

The second BS may send the fourth priority list to the terminal through a RRC Reconfiguration message. Steps S310 and S308 can be executed in parallel.

In step S312, the terminal measures signals of surrounding BSs that do not support a shared carrier to obtain a second measurement result according to the fourth priority list.

After receiving the fourth priority list, the terminal searches signals of surrounding BSs that do not support shared carrier.

In step S314, the terminal selects a first BS according to the second measurement result, and sends a fourth access request to the first BS, and the first BS receives the fourth access request correspondingly.

The terminal may receive signals from multiple BSs that do not support a shared carrier, and can determine whether a signal quality of each BS that does not support a shared carrier meets a second access condition. For example, the second access condition comprises a second signal quality threshold. A BS (for example, the first BS) that does not support a shared carrier and meets the second access condition is selected. The second access condition can be specified according to actual needs. For example, it can be, but not limited to, a BS having a signal quality higher than the signal quality of the second BS. Alternatively, the terminal can select a BS with the best signal quality from the BSs that does not support a shared carrier as the first BS.

In step S316, the terminal sends the capability information to the first BS during establishing of a connection with the first BS, and the first BS receives the capability information sent by the terminal correspondingly during the establishing of a connection with the terminal.

The capability information comprises information about whether the terminal supports the frequency band of the sharing operator in the shared carrier. For example, the capability information comprises a frequency band supported by the terminal. The first BS can determine whether the frequency band supported by the terminal is comprised in the frequency band of the sharing operator in the shared carrier.

In step S318, the first BS completes the connection with the terminal to enable the terminal to access a non-shared network, in a case where the terminal does not support the frequency band of the sharing operator in the shared carrier.

The first BS verifies the capability information of the terminal. If the terminal does not support the frequency band of the sharing operator in the shared carrier, the terminal is enabled to access the non-shared network and reside in the first BS.

In the above embodiment, through broadcasting the third priority list by the BS that supports a shared carrier and reporting the capacity information by the terminal, the new terminal that supports the frequency band of the sharing operator in the shared carrier can access the BS that supports a shared carrier as much as possible, which can improve a load balance between BSs that supports a shared carrier and BSs that does not support a shared carrier, reduce idle time of BSs that does not support shared carrier, and therefore improve the overall service quality.

The present disclosure also provides a BS, which will be described below with reference to FIG. 4.

Figure 4:
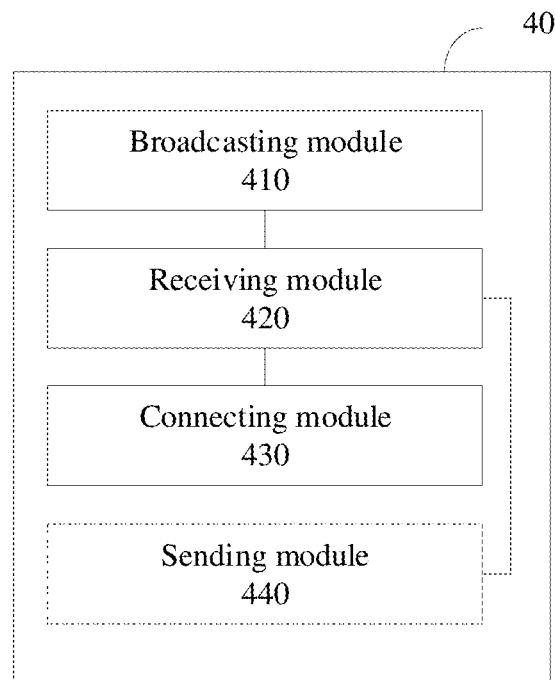
FIG. 4 shows a schematic structural diagram of a BS according to some embodiments of the present disclosure.

FIG. 4 is a structural diagram of a BS according to some embodiments of the present disclosure. As shown in FIG. 4, a BS 40 configured as a first BS of this embodiment comprises: a broadcasting module 410, a receiving module 420 and a connecting module 430. The skilled person in the art can understand that the broadcasting module can be realized by a transmitter in the BS, the receiving module can be realized by a receiver in the BS and the connecting module can be realized by a processer in the BS.

The broadcasting module 410 is configured to broadcast a first priority list, wherein the first priority list comprises information indicating that a priority of a BS that does not support the shared carrier is higher than that of a BS that supports the shared carrier.

The receiving module 420 is configured to receive a first access request from a terminal, and receive capability information from the terminal in a process of establishing a connection with the terminal, wherein the first access request indicates that the terminal selects to access the first BS according to the first priority list and the capability information comprises information about whether the terminal supports a frequency band of a sharing operator in the shared carrier.

The connecting module 430 is configured to complete the connection with the terminal to enable the terminal to access a non-shared network, in a case where the terminal does not support the frequency band of the sharing operator in the shared carrier.

In some embodiments, the BS 40 further comprises: a sending module 440 configured to send a second priority list to the terminal, in a case where the terminal supports the frequency band of the sharing operator in the shared carrier, wherein the second priority list comprises information indicating that a priority of a BS that does not support the shared carrier is lower than that of a BS that supports the shared carrier, for triggering the terminal to reselect and access a BS that supports the shared carrier.

In some embodiments, the terminal sends the capability information to the first BS through a UE Capability Information message, and the receiving module 420 is configured to receive the capability information sent by the terminal through the UE Capability Information message. The sending module 440 is configured to send the second priority list to the terminal through a RRC Reconfiguration message.

In some embodiments, the receiving module 420 is further configured to receive a fourth access request from the terminal, wherein the fourth access request indicates that the terminal reselects to access the first BS according to a fourth priority list sent by a second BS.

The present disclosure also provides a terminal, which will be described below with reference to FIG. 5.

Figure 5:
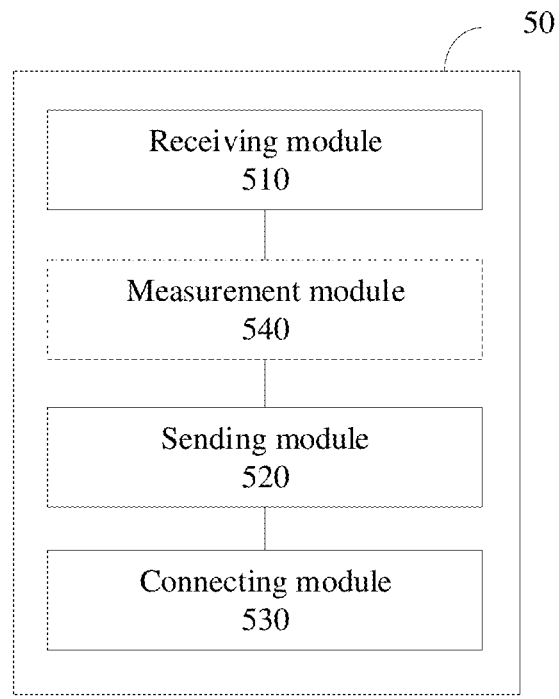
FIG. 5 shows a schematic structural diagram of a terminal according to some embodiments of the present disclosure.

FIG. 5 is a structural diagram of a terminal according to some embodiments of the present disclosure. As shown in FIG. 5, the terminal 50 of this embodiment comprises: a receiving module 510, a sending module 520, and a connecting module 530.

The receiving module 510 is configured to receive a first priority list broadcast by a first Base Station (BS) not supporting a shared carrier, wherein the first priority list comprises information indicating that a priority of a BS that does not support the shared carrier is higher than that of a BS that supports the shared carrier. The skilled person in the art can understand that the receiving module can be realized by a receiver in the terminal.

The sending module 520 is configured to select the first BS according to the first priority list, send a first access request to the first BS and send capability information to the first BS in a process of establishing a connection with the first BS, wherein the capability information comprises information about whether the terminal supports a frequency band of a sharing operator in the shared carrier. The skilled person in the art can understand that the sending module can be realized by a transmitter which executes the selecting operation and a processor which executes the sending operation in the terminal.

The connecting module 530 is configured to complete the connection with the first BS to access a non-shared network, in a case where the terminal does not support the frequency band of the sharing operator in the shared carrier. The skilled person in the art can understand that the connecting module can be realized by a processer in the terminal.

In some embodiments, the terminal 50 further comprises: a measurement module 540. In some embodiments, the receiving module 510 is further configured to receive a second priority list from the first BS, in a case where the terminal 50 supports the frequency band of the sharing operator in the shared carrier, wherein the second priority list comprises information indicating that a priority of a BS that does not support the shared carrier is lower than that of a BS that supports the shared carrier; the measurement module 540 is configured to measure signals of surrounding BSs supporting the shared carrier to obtain a first measurement result according to the second priority list; the sending module 520 is further configured to select a second BS according to the first measurement result, send a second access request to the second BS and send the capability information to the second BS in a process of establishing a connection with the second BS, wherein the second BS is a BS that supports the shared carrier; and the connecting module 530 is further configured to complete the connection with the second BS to access a shared network, in a case where the terminal supports the frequency band of the sharing operator in the shared carrier. The skilled person in the art can understand that the measurement module can be realized by a receiver in the terminal.

In some embodiments, the receiving module 510 is further configured to receive a third priority list broadcast by a second BS supporting the shared carrier, and wherein the third priority list comprises information indicating that a priority of a BS that does not support the shared carrier is lower than that of a BS that supports the shared carrier; the sending module 520 is further configured to select the second BS according to the third priority list, send a third access request to the second BS and send the capability information to the second BS in a process of establishing a connection with the second BS; the connecting module 530 is further configured to complete the connection with the second BS to access a shared network, in a case where the terminal supports the frequency band of the sharing operator in the shared carrier.

In some embodiments, the receiving module 510 is further configured to receive a fourth priority list sent by the second BS, in a case where the terminal 50 does not support the frequency band of the sharing operator in the shared carrier, wherein the fourth priority list comprises information indicating that a priority of a BS that does not support the shared carrier is higher than that of a BS that supports the shared carrier; the measuring module 540 is configured to measure signals of surrounding BSs not supporting the shared carrier to obtain a second measurement result according to the fourth priority list; the sending module 520 is configured to select the first BS according to the second measurement result, send a fourth access request to the first BS and send the capability information to the first BS in a process of establishing a connection with the first BS wherein the capability information comprises information about whether the terminal supports the frequency band of the sharing operator in the shared carrier; the connecting module 530 is further configured to configured to complete the connection with the first BS to access a non-shared network, in a case where the terminal 50 does not support the frequency band of the sharing operator in the shared carrier.

In some embodiments, the receiving module 510 is configured to select the first priority list or the third priority list according to the capability information, in a case where the terminal receives the first priority list broadcast by the first BS and the third priority list broadcast by the second BS, wherein the terminal selects the first priority list in a case where the terminal does not support the frequency band of the sharing operator in the shared carrier, and select the third priority list in a case where the terminal 50 supports the frequency band of the sharing operator in the shared carrier.

The present disclosure further provides a communication system, which will be described below with reference to FIG. 6.

Figure 6:
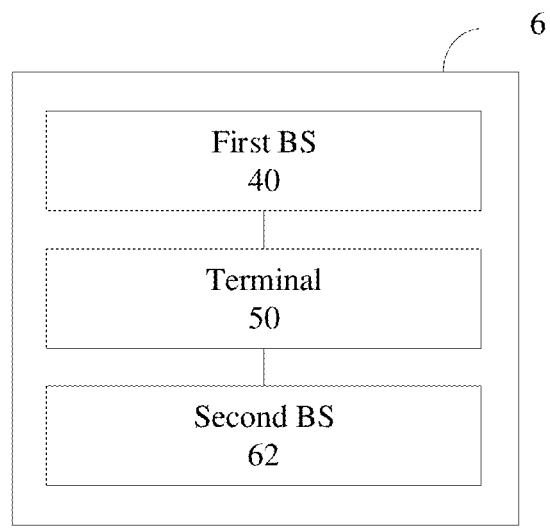
FIG. 6 shows a structural diagram of a communication system according to some embodiments of the present disclosure.

FIG. 6 is a structural diagram of a communication system according to some embodiments of the present disclosure. As shown in FIG. 6, the system 6 of this embodiment comprises: a BS 40 serving as a first BS according to any of the foregoing embodiments and a terminal 50 according to any of the foregoing embodiments. And the communication system further comprise a second BS 62 supporting the shared carrier.

The second BS 62 is configured to receive a second access request sent by the terminal 50, receive the capability information from the terminal 50 in a process of establishing a connection with the terminal 50, complete the connection with the terminal to enable the terminal 50 to access a shared network, in a case where the terminal 50 supports the frequency band of the sharing operator in the shared carrier, wherein the second access request indicates that the terminal 50 reselects to access the second BS according to the second priority list, and the capability information comprises information about whether the terminal 50 supports the frequency band of the sharing operator in the shared carrier.

In some embodiments, the second BS 62 is further configured to broadcast a third priority list, receive a third access request from the terminal 50, receive the capability information from the terminal 50 in a process of establishing a connection with the terminal 50 and complete the connection with the terminal 50 to enable the terminal 50 to access a shared network, in a case where the terminal 50 supports the frequency band of the sharing operator in the shared carrier, wherein the third priority list comprises information indicating that the priority of a BS that does not support the shared carrier is lower than that of a BS that supports the shared carrier, and the third access request indicates that the terminal selects to access the second BS according to the third priority list.

In some embodiments, the second BS 62 is further configured to send a fourth priority list to the terminal 50 to trigger the terminal 50 to reselect and access a BS that does not support the shared carrier, in a case where the terminal 50 does not support the frequency band of the sharing operator in the shared carrier, wherein the fourth priority list comprises information indicating that the priority of a BS that does not support the shared carrier is higher than that of a BS that supports the shared carrier.

The electronic device of this embodiment of the present disclosure may be implemented by various computing devices or computer systems, which will be described below with reference to FIGS. 7 and 8. The electronic device can execute the method executed by the first BS, the second BS or the terminal described in any one of the above embodiments.

Figure 7:
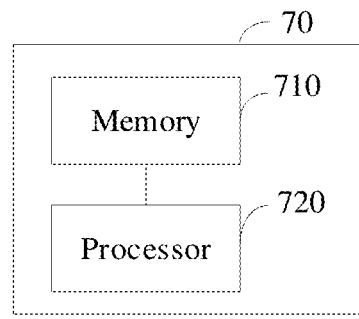
FIG. 7 shows a structural diagram of an electronic device according to some embodiments of the present disclosure.

FIG. 7 is a structural diagram of an electronic device according to some embodiments of the present disclosure. As shown in FIG. 7, the electronic device 70 of this embodiment comprises: a memory 710 and a processor 720 coupled to the memory 710, the processor 720 configured to, based on instructions stored in the memory 710, carry out the method for enabling a terminal to access a base station according to any one of the embodiments of the present disclosure.

Wherein, the memory 710 may comprise, for example, system memory, a fixed non-volatile storage medium, or the like. The system memory stores, for example, an operating system, applications, a boot loader, a database, and other programs.

Figure 8:
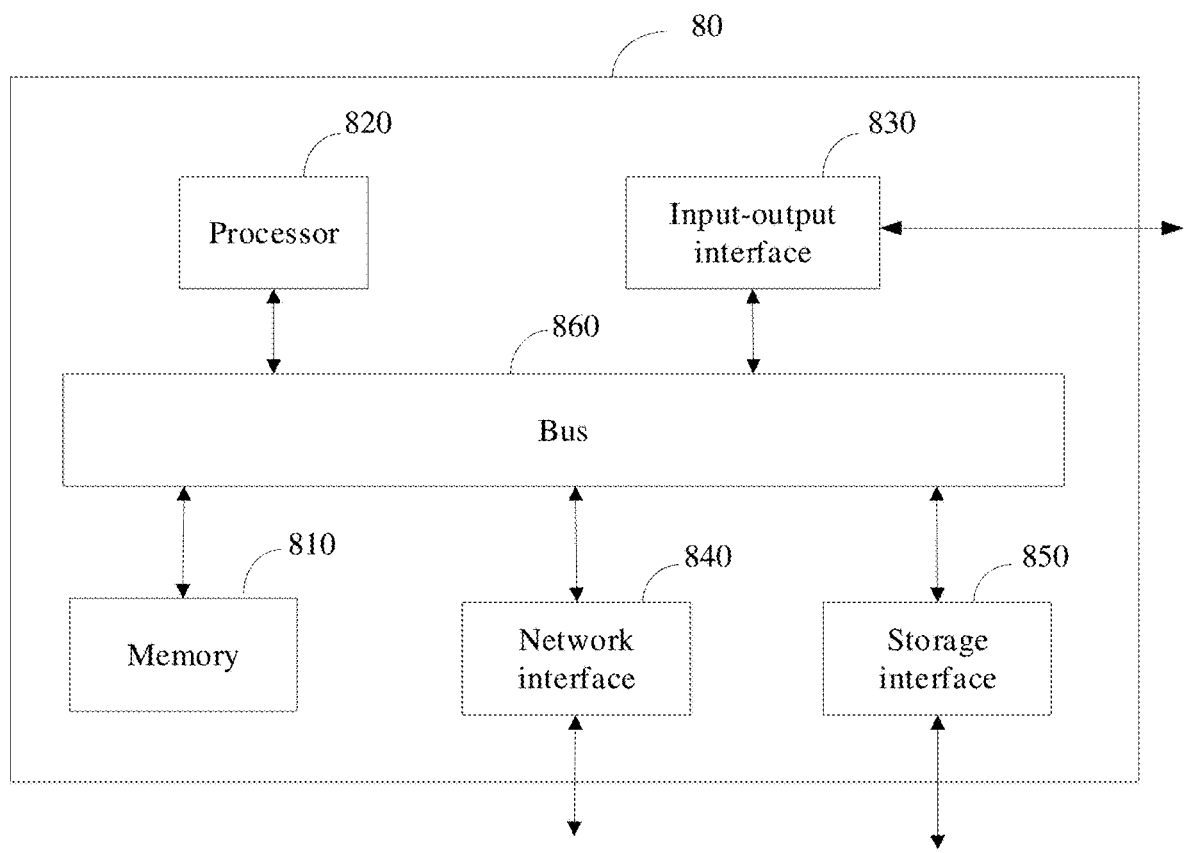
FIG. 8 shows a structural diagram of an electronic device according to other embodiments of the present disclosure.

FIG. 8 is a structural diagram of an electronic device according to some embodiments of the present disclosure. As shown in FIG. 8, the electronic device 80 of this embodiment comprises: a memory 810 and a processor 820 that are similar to the memory 710 and the processor 720, respectively. It may further comprise an input-output interface 830, a network interface 840, a storage interface 850, and the like. These interfaces 830, 840, 850, the memory 810 and the processor 820 may be connected through a bus 860, for example. Wherein, the input-output interface 830 provides a connection interface for input-output devices such as a display, a mouse, a keyboard, and a touch screen. The network interface 840 provides a connection interface for various networked devices, for example, it can be connected to a database server or a cloud storage server. The storage interface 850 provides a connection interface for external storage devices such as an SD card and a USB flash disk.

The present disclosure further provides a non-transitory computer-readable storage medium on which a computer program is stored, wherein the program is executed by a processor to implement the method for enabling a terminal to access a base station of any one of the foregoing embodiments. The program can execute the method executed by the first BS, the second BS or the terminal described in any one of the above embodiments.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical storage device, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable storage device capable of directing a computer or other programmable data processing apparatus to operate in a specific manner such that the instructions stored in the computer readable storage device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams. The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. A method for enabling a terminal to accessing a base station, comprising:
broadcasting, by a first Base Station (BS) not supporting a shared carrier, a first priority list, wherein the first priority list comprises information indicating that a priority of a BS that does not support the shared carrier is higher than that of a BS that supports the shared carrier;
receiving, by the first BS, a first access request from a terminal, wherein the first access request indicates that the terminal selects to access the first BS according to the first priority list;
receiving, by the first BS, capability information from the terminal in a process of establishing a connection with the terminal, wherein the capability information comprises information about whether the terminal supports a frequency band of a sharing operator in the shared carrier; and
completing, by the first BS, the connection with the terminal to enable the terminal to access a non-shared network, in a case where the terminal does not support the frequency band of the sharing operator in the shared carrier.

2. The method for enabling a terminal to accessing a base station according to claim 1, further comprising:
sending, by the first BS, a second priority list to the terminal, in a case where the terminal supports the frequency band of the sharing operator in the shared carrier, wherein the second priority list comprises information indicating that a priority of a BS that does not support the shared carrier is lower than that of a BS that supports the shared carrier, for triggering the terminal to reselect and access a BS that supports the shared carrier.

3. The method for enabling a terminal to accessing a base station according to claim 2, wherein:
the method further comprises:
receiving, by a second BS supporting the shared carrier, a second access request from the terminal, wherein the second access request indicates that the terminal reselects to access the second BS according to the second priority list,
receiving, by the second BS, the capability information from the terminal in a process of establishing a connection with the terminal, and
completing, by the second BS, the connection with the terminal to enable the terminal to access the shared network, in a case where the terminal supports the frequency band of the sharing operator in the shared carrier; and/or
the first BS receives the capability information from the terminal through a UE Capability Information message, and the first BS sends the second priority list to the terminal through a Radio Resource Control (RRC) Reconfiguration message.

4. The method for enabling a terminal to accessing a base station according to claim 1, further comprising:
broadcasting, by a second BS supporting the shared carrier, a third priority list, wherein the third priority list comprises information indicating that a priority of a BS that does not support the shared carrier is lower than that of a BS that supports the shared carrier;
receiving, by the second BS, a third access request from the terminal, wherein the third access request indicates that the terminal selects to access the second BS according to the third priority list;
receiving, by the second BS, the capability information from the terminal in a process of establishing a connection with the terminal; and
completing, by the second BS, the connection with the terminal to enable the terminal to access the shared network, in a case where the terminal supports the frequency band of the sharing operator in the shared carrier.

5. The method for enabling a terminal to access a base station according to claim 4, further comprising:
sending, by the second BS, a fourth priority list to the terminal to trigger the terminal to reselect and access a BS that does not support the shared carrier, in a case where the terminal does not support the frequency band of the sharing operator in the shared carrier, wherein the fourth priority list comprises information indicating that the priority of a BS that does not support the shared carrier is higher than that of a BS that supports the shared carrier.

6. The method for enabling a terminal to access a base station according to claim 5, wherein:
the method further comprises:
receiving, by the first BS, a fourth access request from the terminal, wherein the fourth access request indicates that the terminal reselects to access the first BS according to the fourth priority list;
receiving, by the first BS, the capability information from the terminal in a process of establishing a connection with the terminal, and
completing, by the first BS, the connection with the terminal to enable the terminal to access a non-shared network, in a case where the terminal does not support the frequency band of the sharing operator in the shared carrier; and/or
the second BS receives the capability information from the terminal through a UE Capability Information message, and the second BS sends the fourth priority list to the terminal through a Radio Resource Control (RRC) Reconfiguration message.

7. A method for enabling a terminal to access a base station, performed by a terminal, comprising:
receiving a first priority list broadcast by a first Base Station (BS) not supporting a shared carrier, and the first priority list comprises information indicating that a priority of a BS that does not support the shared carrier is higher than that of a BS that supports the shared carrier;
selecting the first BS according to the first priority list and sending a first access request to the first BS;
sending capability information to the first BS in a process of establishing a connection with the first BS, wherein the capability information comprises information about whether the terminal supports a frequency band of a sharing operator in the shared carrier; and
completing the connection with the first BS to access a non-shared network, in a case where the terminal does not support the frequency band of the sharing operator in the shared carrier.

8. The method for enabling a terminal to accessing a base station according to claim 7, further comprising:
receiving a second priority list from the first BS, in a case where the terminal supports the frequency band of the sharing operator in the shared carrier, wherein the second priority list comprises information indicating that a priority of a BS that does not support the shared carrier is lower than that of a BS that supports the shared carrier;
measuring signals of surrounding BSs supporting the shared carrier to obtain a first measurement result according to the second priority list;
selecting a second BS supporting a shared carrier according to the first measurement result and sending a second access request to the second BS;
sending the capability information to the second BS in a process of establishing a connection with the second BS; and
completing the connection with the second BS to access the shared network, in a case where the terminal supports the frequency band of the sharing operator in the shared carrier.

9. The method for enabling a terminal to access a base station according to claim 7, further comprising:
receiving a third priority list broadcast by a second BS supporting a shared carrier, wherein the third priority list comprises information indicating that a priority of a BS that does not support the shared carrier is lower than that of a BS that supports the shared carrier;
selecting the second BS according to the third priority list and sending a third access request to the second BS;
sending the capability information to the second BS in a process of establishing a connection with the second BS; and
completing the connection with the second BS to access the shared network, in a case where the terminal supports the frequency band of the sharing operator in the shared carrier.

10. The method for enabling a terminal to accessing a base station according to claim 9, wherein:
the method further comprises:
receiving a fourth priority list sent by the second BS, in a case where the terminal does not support the frequency band of the sharing operator in the shared carrier, wherein the fourth priority list comprises information indicating that a priority of a BS that does not support the shared carrier is higher than that of a BS that supports the shared carrier;
measuring signals of surrounding BSs not supporting the shared carrier to obtain a second measurement result according to the fourth priority list,
selecting the first BS according to the second measurement result and sending a fourth access request to the first BS,
sending the capability information to the first BS in a process of establishing a connection with the first BS, and
completing the connection with the first BS to access a non-shared network, in a case where the terminal does not support the frequency band of the sharing operator in the shared carrier; and/or
the method further comprises:
selecting the first priority list of the third priority list according to the capability information, in a case where the terminal receives the first priority list broadcast by the first BS and the third priority list broadcast by the second BS, wherein the terminal selects the first priority list in a case where the terminal does not support the frequency band of the sharing operator in the shared carrier, and selects the third priority list in a case where the terminal supports the frequency band of the sharing operator in the shared carrier.

11. A base station (BS), wherein in a case where the BS is configured to serve as a first BS not supporting a shared carrier, the BS comprises:
a broadcasting module configured to broadcast a first priority list, wherein the first priority list comprises information indicating that a priority of a BS that does not support the shared carrier is higher than that of a BS that supports the shared carrier;
a receiving module configured to receive a first access request from a terminal, and receive capability information from the terminal in a process of establishing a connection with the terminal, wherein the first access request indicates that the terminal selects to access the first BS according to the first priority list and the capability information comprises information about whether the terminal supports a frequency band of a sharing operator in the shared carrier; and
a connecting module configured to complete the connection with the terminal to enable the terminal to access a non-shared network, in a case where the terminal does not support the frequency band of the sharing operator in the shared carrier.

12. The BS according to claim 11, wherein,
the BS further comprises: a sending module configured to send a second priority list to the terminal, in a case where the terminal supports the frequency band of the sharing operator in the shared carrier, wherein the second priority list comprises information indicating that a priority of a BS that does not support the shared carrier is lower than that of a BS that supports the shared carrier, for triggering the terminal to reselect and access a BS that supports the shared carrier; and/or
the receiving module is further configured to receive a fourth access request from the terminal, wherein the fourth access request indicates that the terminal reselects to access the first BS according to a fourth priority list sent by a second BS, and the fourth priority list comprises information indicating that the priority of a BS that does not support the shared carrier is higher than that of a BS that supports the shared carrier.

13. A terminal, comprising:
a receiving module configured to receive a first priority list broadcast by a first Base Station (BS) not supporting a shared carrier, wherein the first priority list comprises information indicating that a priority of a BS that does not support the shared carrier is higher than that of a BS that supports the shared carrier;
a sending module configured to select the first BS according to the first priority list, send a first access request to the first BS and send capability information to the first BS in a process of establishing a connection with the first BS, wherein the capability information comprises information about whether the terminal supports a frequency band of a sharing operator in the shared carrier; and
a connecting configured to complete the connection with the first BS to access a non-shared network, in a case where the terminal does not support the frequency band of the sharing operator in the shared carrier.

14. The terminal according to claim 13, further comprising: a measurement module, wherein:

the receiving module is further configured to receive a second priority list from the first BS, in a case where the terminal supports the frequency band of the sharing operator in the shared carrier, wherein the second priority list comprises information indicating that a priority of a BS that does not support the shared carrier is lower than that of a BS that supports the shared carrier;

the measurement module is configured to measure signals of surrounding BSs supporting the shared carrier to obtain a first measurement result according to the second priority list;

the sending module is further configured to select a second BS according to the first measurement result, send a second access request to the second BS and send the capability information to the second BS in a process of establishing a connection with the second BS, wherein the second BS is a BS that supports the shared carrier; and the connecting module is further configured to complete the connection with the second BS to access a shared network, in a case where the terminal supports the frequency band of the sharing operator in the shared carrier.

15. The terminal according to claim 13, wherein:

the receiving module is further configured to receive a third priority list broadcast by a second BS supporting the shared carrier, and wherein the third priority list comprises information indicating that a priority of a BS that does not support the shared carrier is lower than that of a BS that supports the shared carrier;

the sending module is further configured to select the second BS according to the third priority list, send a third access request to the second BS and send the capability information to the second BS in a process of establishing a connection with the second BS; and the connecting module is further configured to complete the connection with the second BS to access a shared network, in a case where the terminal supports the frequency band of the sharing operator in the shared carrier.

16. The terminal according to claim 15, further comprising: a measurement module, wherein:

the receiving module is further configured to receive a fourth priority list sent by the second BS, in a case where the terminal does not support the frequency band of the sharing operator in the shared carrier, wherein the fourth priority list comprises information indicating that a priority of a BS that does not support the shared carrier is higher than that of a BS that supports the shared carrier; the measuring module is configured to measure signals of surrounding BSs not supporting the shared carrier to obtain a second measurement result according to the fourth priority list, the sending module is configured to select the first BS according to the second measurement result, send a fourth access request to the first BS and send the capability information to the first BS in a process of establishing a connection with the first BS, and the connecting module is further configured to complete the connection with the first BS to access a non-shared network, in a case where the terminal does not support the frequency band of the sharing operator in the shared carrier; and/or the receiving module is configured to select the first priority list of the third priority list according to the capability information, in a case where the terminal receives the first priority list broadcast by the first BS and the third priority list broadcast by the second BS, wherein the terminal selects the first priority list in a case where the terminal does not support the frequency band of the sharing operator in the shared carrier, and select the third priority list in a case where the terminal supports the frequency band of the sharing operator in the shared carrier.

17. A communication system, comprising: a first BS according to claim 11, and a terminal wherein the terminal is configured to:

receive a first priority list broadcast by a first BS not supporting a shared carrier wherein the first priority list comprises information indicating that a priority of a BS that does not support the shared carrier is higher than that of a BS that supports the shared carrier;

select the first BS according to the first priority list, send a first access request to the first BS and send capability information to the first BS in a process of establishing a connection with the first BS, wherein the capability information comprises information about whether the terminal supports a frequency band of a sharing operator in the shared carrier; and complete the connection with the first BS to access a non-shared network, in a case where the terminal does not support the frequency band of the sharing operator in the shared carrier.

18. The communication system according to claim 17, further comprising: a second BS supporting the shared carrier, wherein, the second BS is configured to receive a second access request sent from the terminal receive the capability information from the terminal in a process of establishing a connection with the terminal and complete the connection with the terminal to enable the terminal to access a shared network, in a case where the terminal supports the frequency band of the sharing operator in the shared carrier, wherein the second access request indicates that the terminal reselects to access the second BS according to the second priority list;

the second BS is father configured to broadcast a third priority list, receive a third access request from the terminal, receive the capability information from the terminal in a process of establishing a connection with the terminal and complete the connection with the terminal to enable the terminal to access a shared network, in a case where the terminal supports the frequency band of the sharing operator in the shared carrier, wherein the third priority list comprises information indicating that the priority of a BS that does not support the shared carrier is lower than that of a BS that supports the shared carrier, and the third access request indicates that the terminal selects to access the second BS according to the third priority list; and/or the second BS is configured to send a fourth priority list to the terminal to trigger the terminal to reselect and access a BS that does not support the shared carrier, in a case where the terminal does not support the frequency band of the sharing operator in the shared carrier, wherein the fourth priority list comprises information indicating that the priority of a BS that does not support the shared carrier is higher than that of a BS that supports the shared carrier.

19. An electronic device, comprising:

a processor; and a memory coupled to the processor for storing instructions, which when executed by the processor, cause the processor to execute the method for enabling a terminal to access a base station according to claim 1, or cause the processor to:

receive a first priority list broadcast by a first BS not supporting a shared carrier, wherein the first priority list comprises information indicating that a priority of a BS that does not support the shared carrier is higher than that of a BS that supports the shared carrier;

select the first BS according to the first priority list, send a first access request to the first BS and send capability information to the first BS in a process of establishing a connection with the first BS, wherein the capability information comprises information about whether the terminal supports a frequency band of a sharing operator in the shared carrier; and complete the connection with the first BS to access a non-shared network, in a case where the terminal does not support the frequency band of the sharing operator in the shared carrier.

* * * * *